United States Patent

[11] 3,634,120

| [72] | Inventor | Douglas A. Newman<br>Glen Cove, N.Y. |
|---|---|---|
| [21] | Appl. No. | 800,413 |
| [22] | Filed | Feb. 19, 1969 |
| [45] | Patented | Jan. 11, 1972 |
| [73] | Assignee | Columbia Ribbon and Carbon<br>Manufacturing Co., Inc.<br>Glen Cove, N.Y.<br>The portion of the term of the patent subsequent to May 6, 1986, has been disclaimed. |

[54] PROCESS OF PRODUCING TRANSFER ELEMENTS
7 Claims, 1 Drawing Fig.

[52] U.S. Cl............................................. 117/36.1,
117/36.4, 117/138.8
[51] Int. Cl............................................ B41m 5/10
[50] Field of Search........................................ 117/36.1,
36.2, 36.4, 47 R

[56] References Cited
UNITED STATES PATENTS

| 3,055,297 | 9/1962 | Leeds............................ | 117/36.1 |
| 3,102,824 | 9/1963 | Newman......................... | 117/36.1 |
| 3,442,680 | 5/1969 | Newman......................... | 117/36.1 |
| 3,442,681 | 5/1969 | Newman......................... | 117/36.4 |
| 3,471,360 | 10/1969 | Newman......................... | 117/36.1 |
| 3,484,268 | 12/1969 | Newman......................... | 117/36.1 |

*Primary Examiner*—Murray Katz
*Attorney*—Johnson & Kline

ABSTRACT: Process of producing pressure sensitive transfer elements having a plastic film foundation comprising forming the foundation from a resinous composition containing a blowing agent at least at one surface, activating the blowing agent only at said surface to form a porous surface and applying an ink-releasing layer to said surface.

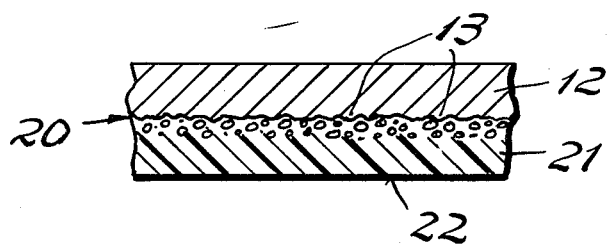
INVENTOR.
Douglas A. Newman

PROCESS OF PRODUCING TRANSFER ELEMENTS

The present invention relates to a field of manifolding and duplicating sheets and ribbons such as carbon papers and typewriter ribbons and the like, and is concerned primarily with he problem of improving the adhesion or bonding strength between the pressure sensitive ink composition and the foundation.

Transfer compositions generally have good bonding strength for a paper foundation because the paper is porous and the paper fibers absorb the oils and other liquid ingredients of the ink composition. However this absorption is deleterious because the separation of the components of the ink composition reduces or destroys the transferability of the ink. To overcome this problem, paper foundations are generally coated with a thin layer of ink-impervious resin as an undercoating prior to the application of the transfer layer. This involves an additional coating step and may result in curling problems unless both sides of the paper are similarly coated with thin resin layers.

Smooth plastic film foundations are also used to provide greater strength and less thickness than paper foundations. However such films provide so little bonding strength for transfer layers that peeling and cracking of the layer may result unless an adhesive undercoating layer is first applied to the film surface.

It is the principal object of the present invention to provide a foundation for transfer compositions which has the advantages of paper and plastic film and which is free of the disadvantages of both.

It is another object of the present invention to provide transfer elements having a foundation of increased flexibility and deformability, permitting the transmission of sharper type impressions to the copy sheet.

These and other objects and advantages will be clear to those skilled in the art in the light of the present disclosure including the drawing which is a diagrammatic cross section, to an enlarged scale, of a transfer element according to the present invention.

According to the present invention, the foundation for a pressure sensitive transfer element comprises a porous film of synthetic thermoplastic resin having open pores only at the surface carrying the layer of imaging composition, whereby the layer is integrated with the foundation and resists peeling and cracking or otherwise transferring therefrom prior to use.

According to the present invention, exemplified by the drawing, the foundation is porous at only the supporting surface so as to prevent permeation of the ink through to the impression surface.

The drawing illustrates transfer element 20 having a semiporous foundation 21 integrated with a pressure sensitive imaging layer 12. The foundation has open pores 13 only at the surface providing integration with the imaging layer, and contains only a few closed pores 14 adjacent the surface with the open pores. The remainder of the foundation is substantially nonporous synthetic thermoplastic resin and the impression surface 22 is relatively smooth.

The synthetic thermoplastic resinous foundations useful according to the present invention may be produced according to any one of a number of known processes depending upon the results desired. Porosity may be produced at just one surface, as shown in the drawing, by means of conventional blowing agents which may either be incorporated into the foundation at only the desired surface or incorporated throughout the foundation but only activated at the desired surface. This may be accomplished by casting the resin solution and thereafter sprinkling a particulate blowing agent on the exposed surface, evaporating the solvent and activating the blowing agent, or by applying the activating force, such as heat, to only one surface of the resinous layer having the blowing agent uniformly dispersed throughout, so that only the blowing agent particles at the treated surface are activated.

According to the present invention, an amount of inert filler is included in the film-forming composition in order to make the final porous film more paper like. The filler is preferably a white material such as titanium dioxide and/or zinc oxide to assist in providing the desired white color. The inclusion of porous fillers such as clay is also desirable in order to increase the affinity between the porous film and the applied ink transfer composition. The inclusion of filler also gives the film a paperlike feel and the characteristic crackle sound of paper.

The amount of filler may be varied over relatively wide limits. Amounts of small as 5 percent by weight, based upon the weight of film-forming binder, are advantageous in lending whiteness to the film and amounts as high as about 40 percent may be used without interferring with the strength and flexibility of the film.

In all cases the formed porous foundation in lighter in weight and more compressible than solid film foundations, and has a surface porosity which is exceptionally receptive and retentive of a pressure sensitive imaging layer. Whether the imaging layer is a resinous composition applied as a solution in a volatile solvent which does not dissolve the porous film or is a hot-melt-applied wax composition, the applied composition penetrates the open pores on the film surface so that the layer bonds firmly to the film on solidification. This prevents the imaging layer from peeling or flaking from the film foundation, which problem is particularly important in the case of tightly wound film base typewriter ribbons.

Also the ability of the foundation to develop and accumulate static charges is substantially reduced.

The present foundations may be based upon any synthetic thermoplastic film-forming resin including preferably the vinyl resins, the acrylic resins, nylon-type polyamides, the polyolefins and the polyurethanes. Illustrative resins are polyvinyl chloride, polystyrene, polymethyl methacrylate, alcohol-soluble nylon, polyethylene polypropylene, diisocyanate modified polyester resins, and the like. The binder generally constitutes from about 50 percent to 95 percent of the weight of the foundation.

Blowing agents suitable for use according to this invention are those conventional materials which are commercially available for the purpose. These are generally finely divided solid materials which are heat activatable to liberate a gas such as nitrogen, a nitrogen oxide, carbon dioxide or other safe gas. Illustrative materials are N,N-dinitroso pentamethylene tetramine, N,N'-dimethyl-N,N'-dinitroso terephthalamide, p,p'-oxy-bis-(benzene sulfonyl hydrazide), diazoaminobenzene, and the like.

Other chemical combinations which react to liberate a gas are also suitable such as the combination of a bicarbonate, such as sodium bicarbonate, and an acid, such as boric acid. Also volatile liquid blowing agents may be used, alone or preferably in combination with a solid particulate blowing agent to produce the desired results. Such liquids are inert materials which are incompatible with the resin used and which evaporate at a temperature below the extrusion temperature of the resin but are maintained dispersed in the resin by the pressure within the extrusion apparatus. During extrusion the liquid evaporates to leave the evacuated pores in the extruded film. Illustrative materials are aliphatic hydrocarbons such as pentane and hexane.

Blowing agents are effective in very small amounts, particularly when applied at only one surface of the film-forming layer. Amounts as small as 0.01 percent, based on the weight of the film-forming binder material, are suitable to produce a degree of surface porosity by the use of from 0.5 percent to 1.5 percent is preferred. Amounts as high as about 10 percent, based on the weight of film-forming binder, may be used.

The porous foundations of the present invention may have a thickness of from about 1 to 8 mils although thicknesses between about 2 and 5 mils are preferred.

The transfer sheet provides excellent sharpness and clarity of images, apparently because of the reduced density of the foundation which permits the transfer sheet to conform to the configuration of the imaging force.

The film foundation may be rendered porous at only one surface, as shown in the drawing according to the following example:

A film-forming composition is formulated as follows:

| Ingredients | Parts by weight |
| --- | --- |
| Nylon (alcohol-soluble) | 10.0 |
| Diatomaceous earth | 3.0 |
| p,p''-oxy-bis-(benzene sulfonyl hydrazide) | 0.1 |
| Ethyl alcohol | 85.0 |

The composition is uniformly mixed and then cast on a release surface to form a self-supporting film of 2.5 mil thickness after evaporation of the solvent. The film is then heated at one surface above about 200° C. whereby the blowing agent at the heated surface is activated to release a nitrogen gas and form open and closed pores at the film surface.

If desired, the film may be stretched before or after activation of the blowing agent to reduce its caliper and increase its strength.

The porous surface of the film is thereafter coated with the desired transfer composition which may be a hot-melt wax composition as follows:

| Ingredients | Parts by weight |
| --- | --- |
| Carnauba wax | 40 |
| Raw montan wax | 10 |
| Beeswax | 10 |
| Mineral oil | 20 |
| Carbon black | 20 |

The composition is melted to a uniform blend and applied as an even layer having a thickness of about 0.8 mil to the porous surface of the nylon foundation. The wax composition integrates with the surface pores of the foundation and bonds intimately therewith on cooling. While the wax layer transfers nearly completely under the effects of imaging pressure, it does not flake or peel from the foundation prior to use even though there is no intermediate bonding layer adhering it to the foundation.

I claim:

1. Process of producing a pressure sensitive transfer element which comprises the steps of:
   a. preparing a film-forming composition from a synthetic thermoplastic resinous binder material, adding to said composition a blowing agent before said composition has been formed into a self-supporting film, forming said film, said blowing agent being present at least at one surface of said film,
   b. activating said blowing agent only at said one surface of the film to produce an ink-receptive open porous surface;
   c. applying to said ink receptive surface a thin layer of liquid composition comprising a binder material and coloring matter which integrates with said open porous surface; and
   d. solidifying said composition to form a thin pressure sensitive ink releasing layer bonded to said surface.

2. The process according to claim 1 in which the self-supporting film is prepared by uniformly mixing the binder and the blowing agent and then extruding the film and activating the blowing agent at only one surface of the film.

3. The process according to claim 1 in which the self-supporting film is prepared by dissolving the binder material in a volatile organic solvent, adding the blowing agent thereto form a uniform mixture, applying the composition as a thin layer to a coating surface, evaporating the volatile solvent and heating only one surface to activate the blowing agent at said surface.

4. The process according to claim 1 in which the film-forming composition comprises from about 50 percent to nearly 95 percent by weight of said binder material, from about 5 percent to 40 percent by weight of a filler material and from about 0.01 percent to 10 percent by weight of said blowing agent.

5. The process according to claim 1 in which releasing layer is applied as a solution of a resinous binder material in a volatile solvent which is nonsolvent for the porous film foundation.

6. The process according to claim 1 in which said ink-releasing layer comprises a nontransferably resinous network containing pressure exudable droplets of ink.

7. The process according to claim 1 in which said ink-releasing layer comprises a frangible layer of colored wax.

* * * * *

PO-1050
(5/69)

UNITED STATES PATENT OFFICE
CERTIFICATE OF CORRECTION

Patent No. 3,634,120            Dated January 11, 1972

Inventor(s) Douglas A. Newman

It is certified that error appears in the above-identified patent and that said Letters Patent are hereby corrected as shown below:

Column 4, line 24, "coating" should read -- casting --; line 33, after "which" the words -- the ink -- have been omitted.

Signed and sealed this 30th day of May 1972.

(SEAL)
Attest:

EDWARD M. FLETCHER, JR.          ROBERT GOTTSCHALK
Attesting Officer                    Commissioner of Patents